United States Patent
Hicks et al.

(10) Patent No.: US 11,260,611 B2
(45) Date of Patent: Mar. 1, 2022

(54) IDENTIFIABLE COMPOSITE REWORK SYSTEM AND METHOD

(71) Applicant: THE BOEING COMPANY, Chicago, IL (US)

(72) Inventors: Tony Dean Hicks, Charleston, SC (US); William B. Nichols, Charleston, SC (US); Kathryn Mary Nowicki, Darien Center, NY (US)

(73) Assignee: The Boeing Company, Chicago, IL (US)

( * ) Notice: Subject to any disclaimer, the term of this patent is extended or adjusted under 35 U.S.C. 154(b) by 104 days.

(21) Appl. No.: 16/238,011

(22) Filed: Jan. 2, 2019

(65) Prior Publication Data

US 2020/0207039 A1    Jul. 2, 2020

(51) Int. Cl.
  *B29C 73/02* (2006.01)
  *B64F 5/40* (2017.01)
  *B29C 73/10* (2006.01)
  *B29L 31/30* (2006.01)

(52) U.S. Cl.
  CPC ....... *B29C 73/02* (2013.01); *B29L 2031/3076* (2013.01)

(58) Field of Classification Search
  None
  See application file for complete search history.

(56) References Cited

U.S. PATENT DOCUMENTS

| 5,561,173 A * | 10/1996 | Dry ......................... A61L 27/48 |
| | | 428/320.2 |
| 5,833,795 A * | 11/1998 | Smith ..................... B29C 73/02 |
| | | 156/272.4 |
| 6,426,138 B1 * | 7/2002 | Narushima ............. H01L 24/83 |
| | | 428/343 |
| 2012/0163981 A1 | 6/2012 | Hong |
| 2015/0328847 A1 | 11/2015 | Kia et al. |
| 2015/0338296 A1 | 11/2015 | Georgeson et al. |

FOREIGN PATENT DOCUMENTS

FR      2971251 A1      8/2012

* cited by examiner

*Primary Examiner* — Sheeba Ahmed
(74) *Attorney, Agent, or Firm* — Coats & Bennett, PLLC

(57) ABSTRACT

Aspects of the present disclosure are directed to a doped composite rework material including a fiber-containing material, a resin-containing material, and a dopant, with the dopant configured to impart an identifying characteristic to the doped composite rework material; and methods for precluding rework of a previously reworked composite material.

20 Claims, 5 Drawing Sheets

IDENTIFIABLE COMPOSITE REWORK SYSTEM AND METHOD

EXPORT CONTROL STATEMENT

Export of this technology is controlled under the United States Export Administration Regulations (EAR) (15 CFR 730-774). An export License may be required before it is used for development, production or use by foreign persons from specific countries. It is the responsibility of the individual in control of this data to abide by U.S. export laws.

TECHNOLOGICAL FIELD

The present disclosure relates generally to the field of composite rework and composite rework materials, systems, and methods. More specifically the present disclosure relates to the field of detecting regions of composite rework, and detectable composite rework materials, systems, and methods.

BACKGROUND

As the use of composite materials in manufacturing continues, there exists a continuing need to rework such materials. For various composite material products, repeated rework of a composite material section may not desired, or may not be allowed by regulation. Determining the existence and location of a previously reworked section is desirable.

SUMMARY

Aspects of the present disclosure are directed to a composite rework material including a fiber-containing material, a resin-containing material, and a dopant, with the dopant configured to impart an identifying characteristic to the composite rework material.

In another aspect, the identifying characteristic is detectable by a detector.

In a further aspect, the identifying characteristic is a visual characteristic that is detected visually.

Further disclosed aspects are directed to objects comprising a substrate, with the substrate including a composite rework material, with the rework material including, for example, a fiber-containing material, a resin-containing material, and a dopant, and with the dopant configured to impart an identifying characteristic to the composite rework material.

Further disclosed aspects are directed to objects, including structural objects such as, for example, buildings, bridges, etc., with such objects including a composite rework material including a fiber-containing material, a resin-containing material, and a dopant, with the dopant configured to impart an identifying characteristic to the composite rework material.

According to another disclosed aspect, vehicles include a composite rework material including a fiber-containing material, a resin-containing material, and a dopant, said dopant configured to impart an identifying characteristic to the composite rework material. Such vehicles include, for example, a manned spacecraft, an unmanned spacecraft, a manned rotorcraft, an unmanned rotorcraft, a drone, a satellite, a manned terrestrial vehicle, an unmanned terrestrial vehicle; a manned surface marine vehicle, an unmanned surface marine vehicle, a manned sub-surface marine vehicle, an unmanned sub-surface marine vehicle, etc., and combinations thereof.

Further aspects of the present disclosure provide methods for reworking a composite substrate material on a composite substrate (e.g., including a laminated composite substrate, etc.), including defining a composite structure requiring rework and applying a doped composite rework material, with the composite rework material (e.g., composite rework material "patch", etc.), with the rework material including a fiber-containing material, a resin-containing material, and a dopant, and with the dopant configured to impart an identifying characteristic to the composite rework material.

In a further aspect, presently disclosed methods include curing the doped composite material.

According to a present aspect, methods for detecting a previously reworked composite material region on a composite substrate and methods for precluding reworking a previously reworked composite substrate material region on a composite substrate are disclosed. One presently disclosed method includes applying a doped composite material to a composite substrate material to form a doped composite rework material applied to a composite substrate to form a doped composite material rework region on the composite substrate, with the doped composite rework material including a fiber-containing material, a resin-containing material, and a dopant.

In a further aspect, presently disclosed methods include curing the doped composite material.

According to another aspect, a method for detecting a composite material rework region on a substrate is disclosed, with the method including removing a coating from a composite substrate material to form an exposed composite material rework region, detecting a doped composite material rework region, said composite material rework region comprising a doped composite rework material, and identifying at least one identifying characteristic of the doped composite rework material.

According to a further aspect, disclosed methods further include providing a catalyst to the composite material rework region, and activating the doped composite repair material.

According to a further aspect, the identifying characteristic includes a visual characteristic that is visibly or visually detected.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
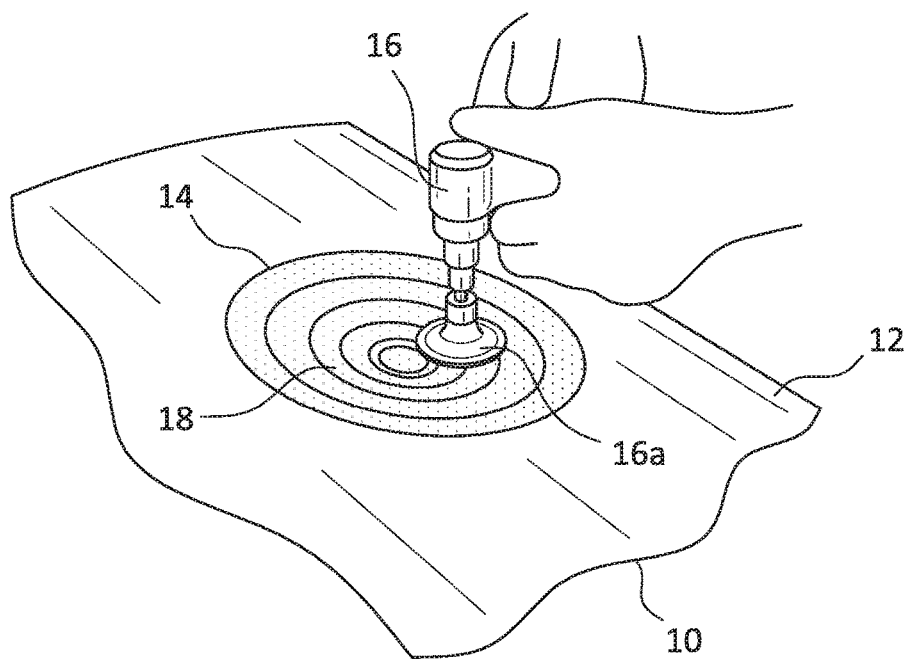
Figure 2:
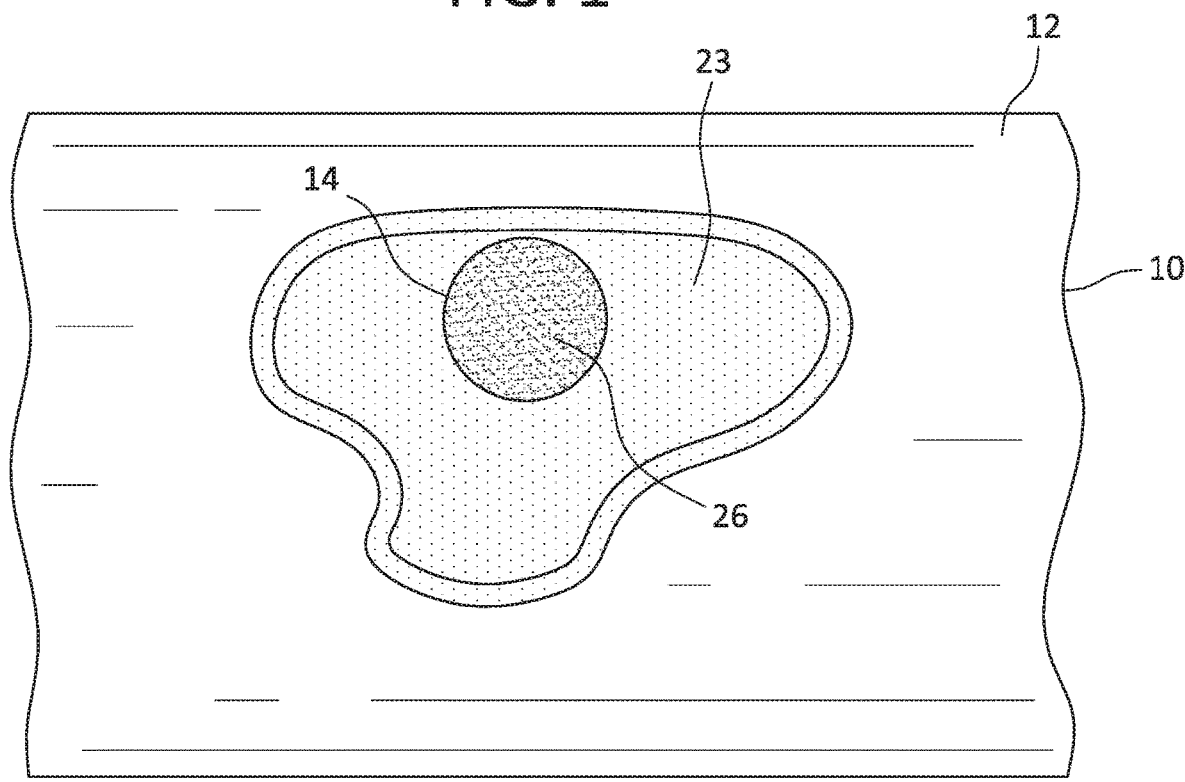
Figure 3:
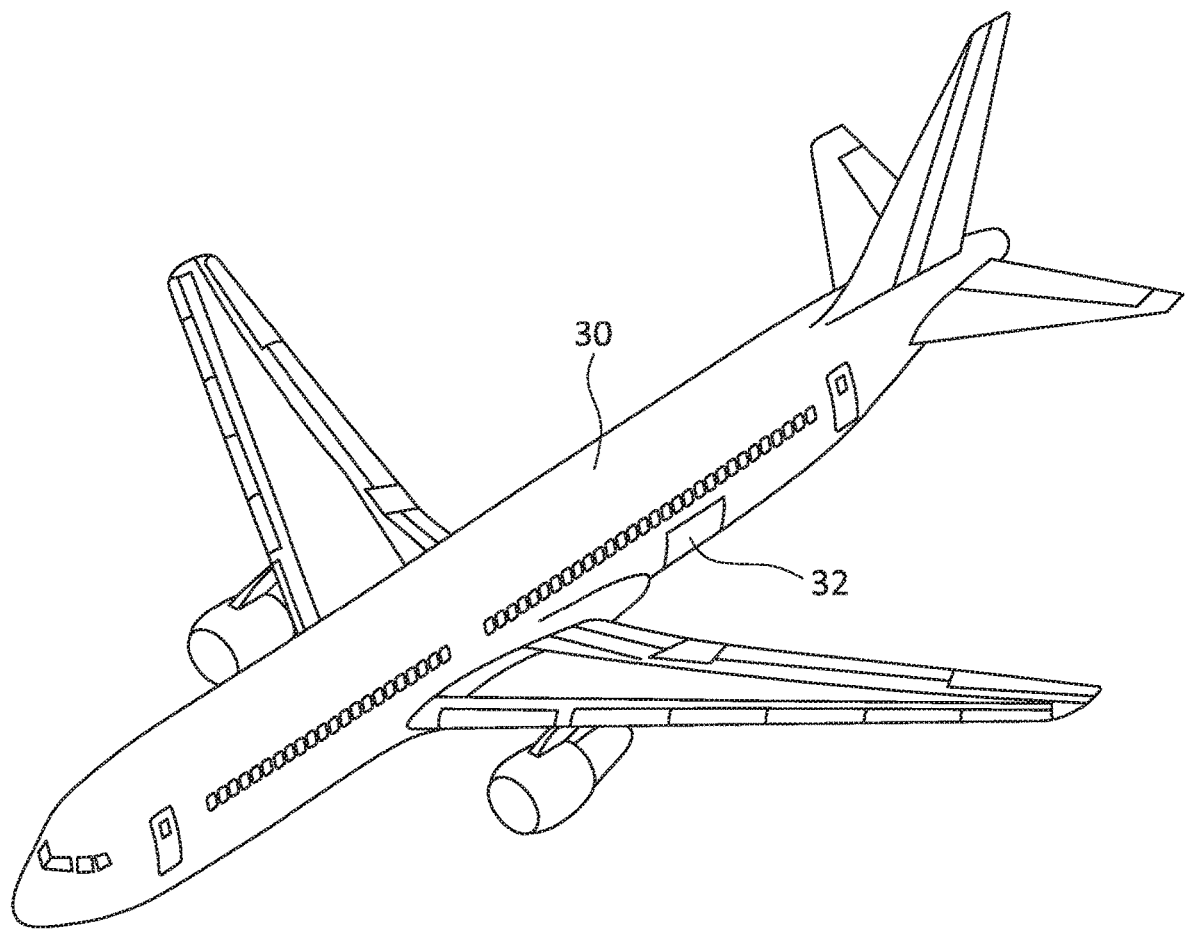
Figure 4:
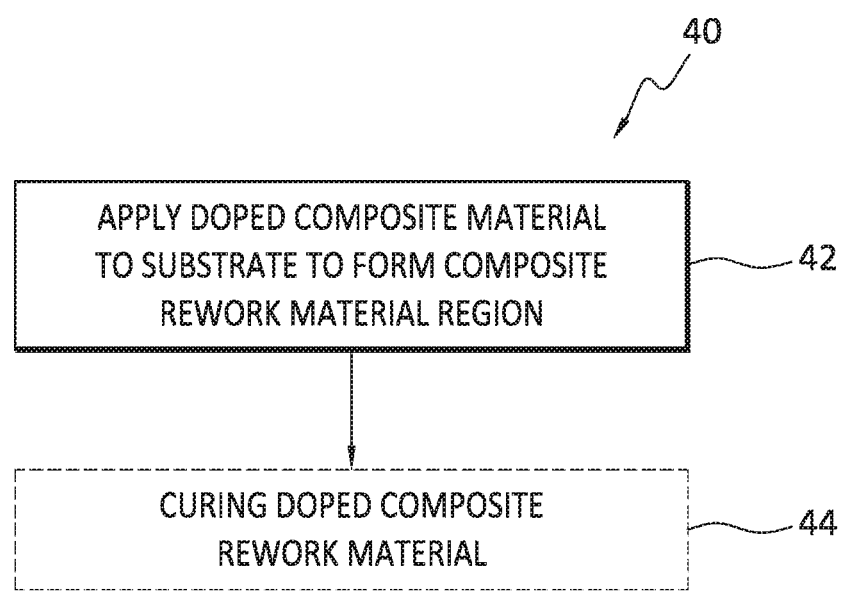
Figure 5:
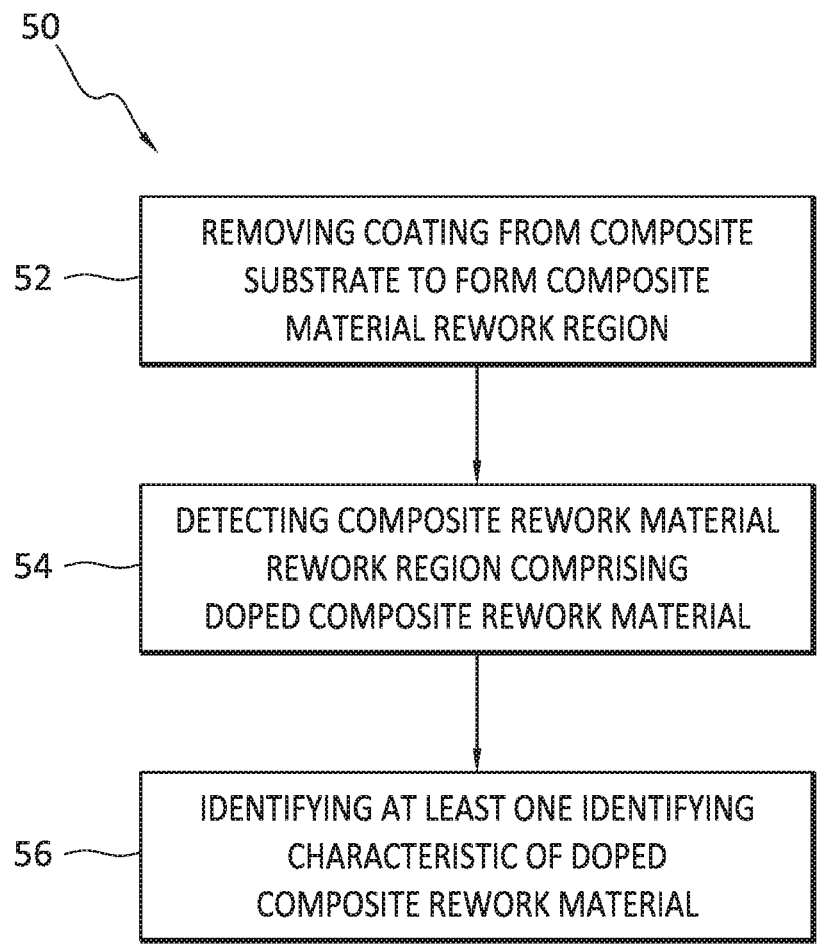
Figure 6:
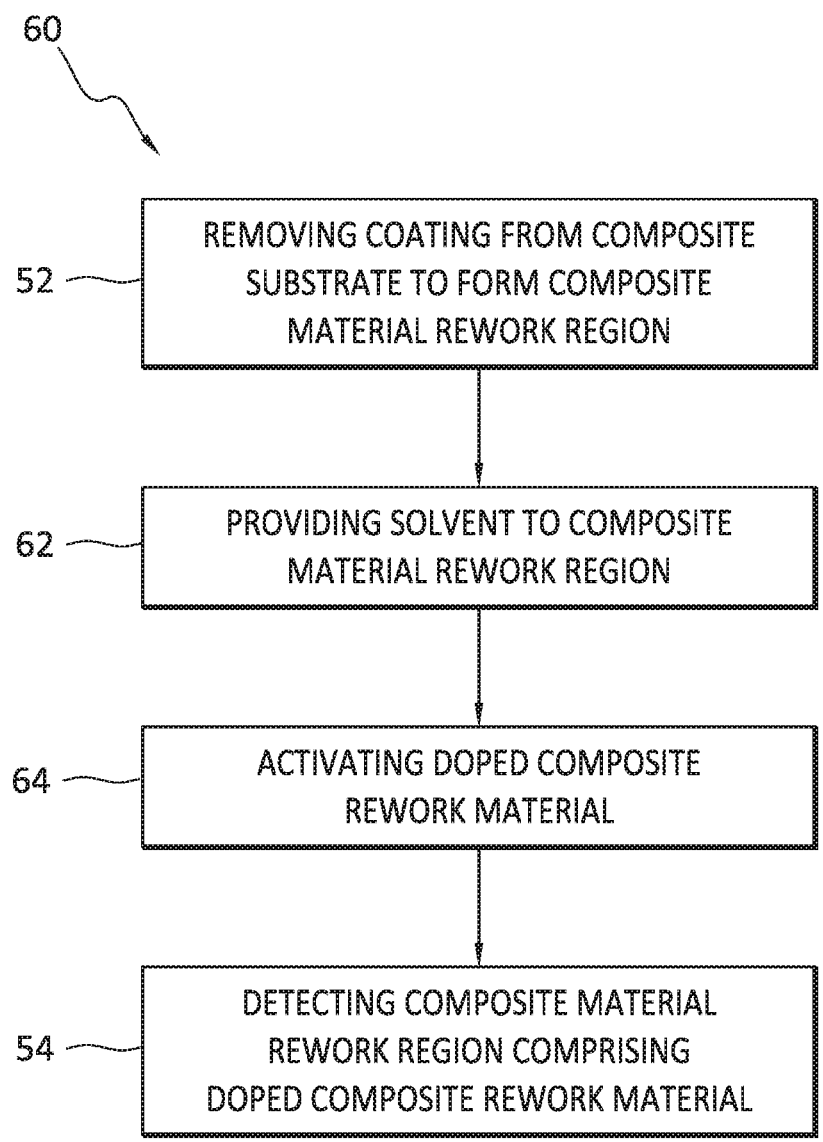

Having thus described variations of the disclosure in general terms, reference will now be made to the accompanying drawings, which are not necessarily drawn to scale, and wherein:

FIG. 1 is an illustration of an area of previously repaired composite material;

FIG. 2 is an illustration of a previously repaired composite material according to an aspect of the present disclosure;

FIG. 3 is an illustration of an aircraft;

FIG. 4 is a flowchart outlining a method according to an aspect of the present disclosure;

FIG. 5 is a flowchart outlining a method according to an aspect of the present disclosure; and FIG. 6 is a flowchart outlining a method according to an aspect of the present disclosure.

DETAILED DESCRIPTION

The term "composite material" as used herein refers to a material that can be a two-component material, often including a matrix (e.g., a polymer resin such as, for example an epoxy or an acrylamide, etc.), and a reinforcement (e.g., a carbon fiber, boron fiber, glass fiber, aramid fiber, etc.). In a carbon fiber reinforced polymer (CFRP), the reinforcement is the carbon fiber that provides strength. The reinforcement is combined within a matrix (e.g., a polymer resin such as, for example, an epoxy resin), with the matrix binding the reinforcements together. Such materials are desirable replacements for structural metals due to factors including their decreased overall weight as compared to metals, high strength-to-weight ratios, etc.

CFRP parts can be made by layering sheets of carbon fiber in contact with a mold or other tooling to shape the CFRP into final product. A resin-based material is then added, followed by heat-curing or air-curing. Alternatively, CFRP laminates can be prepared by layering pre-impregnated fiber material or "prepregs" (e.g., fiber material pre-impregnated with resin material such as, for example, epoxy-based resin, acrylamide-based resin, etc.), over shaping tooling, followed by curing.

Reworking the structures made from, or otherwise incorporating, composite materials requires techniques and materials that will insure that the area of composite material requiring rework observes a structural integrity that approximates or exceeds that of the original composite material. Reworked sections or reworked regions of composite materials used in specialized structures, including, for example, and without limitation, vehicles (e.g. manned and unmanned aircraft, spacecraft, watercraft, terrestrial vehicles, etc.), require returning the composite material structure to a state of original strength after rework is completed. Further, reworks to composite materials used in specialized structures can further require preserving aerodynamic characteristics that may be present including, for example, minimizing moment-induced failure modes, minimizing induced localized stresses, etc.

Since the reworking of laminate composite materials often involves the removal of delaminated layers, so-called "scarfing" techniques have been developed to achieve and satisfy rework according to industry accepted or mandated requirements. When structural or other damage occurs to composite materials, sanding or cutting of plies (e.g., "scarfing") can be employed to rework composite regions, and "scarfing" can be used to achieve individual steps in a stepped scarf joint repair, as well as a continuous transition in a tapered joint repair.

Aspects of the present disclosure provide methods for reworking a laminated composite structure including defining a composite structure requiring rework and applying a composite rework material, with the composite rework material (e.g., composite rework material "patch", etc.) including a fiber-containing material, a resin-containing material, and a dopant, with the dopant configured to impart an identifying characteristic to the composite rework material.

According to scarfing techniques accepted in the rework of composite materials, for a laminated composite material, the damaged composite plies are often peeled and removed. Each of the damaged plies to be peeled and removed can be separately scored before peeling. The number of replacement plies added can be at least equal to the number of damaged plies that are separately peeled and removed.

Presently disclosed aspects further include creating and applying a composite rework material and aligning and bonding the composite rework material within the composite rework region. The composite rework material is formed by combining a fiber-containing material, a resin-containing material, and a dopant, with the dopant configured to impart an identifying characteristic to the composite rework material.

Other presently disclosed aspects include methods for detecting a previously reworked composite material region on a composite substrate and methods for precluding further reworking a previously reworked composite substrate material region. Preclusion of reworking a previously reworked composite region is important in industries where repeated reworking contravenes existing regulation(s). In such instances, it is important to recognize or detect the existence of a composite material region that has been previously reworked. While previous methods have allowed for the identification of a boundary of a reworked region, presently disclosed methods, systems, and composite rework materials identify the existence of a previously reworked region throughout the area of the previously reworked region by providing a composite rework material with an identifiable characteristic such that the substantial entirety of the rework material can be detected.

As shown in FIG. 1, a composite material substrate 10 having a composite material substrate surface 12 is shown with a composite material rework region 14 being scarfed. A composite material removal device 16 having an abrasive head 16a is shown removing composite material from the composite material rework region 14 to form a stepped composite material rework region 18. According to an aspect, a composite rework material (e.g., a composite rework material "patch") is applied to the composite rework region and cured to complete a rework protocol. See FIG. 2.

FIG. 2 shows the composite material substrate 10 of FIG. 1, with the composite material rework completed. FIG. 2 further shows the composite material substrate 10 having composite material substrate surface 12 and a section of exposed composite material 23. An amount of doped composite rework material 26 has been added to a scarfed area, (e.g., the stepped composite material rework region 18 shown, for example, in FIG. 1), with the doped composite rework material 26 cured to form a cured doped composite rework material in the form of a doped composite material rework "patch". As shown in FIG. 2, the doped composite rework material 26 has a visually identifying characteristic (e.g., a visually perceived contrast from the surrounding composite material based, for example, on a color contrast, etc.). According to an aspect, the doped composite rework material 26 can then be painted or otherwise coated, with the object being reworked (e.g., a reworked vehicle, etc.) then placed back into service.

For non-limiting illustrative purposes, FIG. 3 shows an object having a component that in turn has a composite substrate that can be reworked according to aspects of the present disclosure. FIG. 3 shows an aircraft 30, with a cargo door 32 made from a composite material that can sustain damage to a composite material of the type that can make use of the presently disclosed composite material rework procedures, protocols, systems, and the doped composite rework material having identifiable characteristics.

The identifying characteristic present in the doped composite rework material 26 (e.g., as shown in FIG. 2) can be perceived in place (e.g. at a doped composite material rework region comprising the doped composite rework material 26), both at the time the rework is completed, and also throughout the life of the reworked structure. That is, should a composite material structure be reworked according to present aspects, and should the composite material structure incur future need for rework, one seeking to effect a second rework in the vicinity of the previously reworked region (e.g., the doped composite material rework region) would expose the composite material substrate and become alerted to the presence of the previously applied composite material rework patch, due to the detection of at least one identifying characteristic of the composite rework material patch.

The ability to determine that a composite material requiring rework has already, previously, been reworked is important. Various industries have regulations in place that do not allow for composite material parts to be reworked more than once. As a result, according to present aspects, the use of a composite rework material patch with an identifying characteristic assists a rework operator in precluding a subsequent rework of a previously reworked area in or on a composite material.

The doped composite rework material can include, for example, a resin-based material selected for compatibility with a composite material being reworked. That is, if the composite material being reworked comprises, for example, an epoxy-based resin material (e.g., BMS 5-154 adhesive for composite bonding, 350° F. cure; BMS 5-160—adhesive for primary structure composite bonding; BMS 8-301 such as Hysol EA 9390—Henkel Loctite, etc.; BMS 8-201, such as Epocast 50-A1-Huntsman, etc.), and a particular fiber component (e.g., glass fiber, carbon fiber, boron fiber, aramid fiber, etc.), the doped composite rework material will comprise a compatible epoxy-based resin material and fiber to accomplish the rework. Similarly, if the composite material being reworked comprises, for example, a Bismaleimide-based (BMI) resin material, and a particular fiber component (e.g., glass fiber, carbon fiber, boron fiber, aramid fiber, etc.), the doped composite rework material will comprise a compatible Bismaleimide-based (BMI) resin material and fiber to accomplish the rework.

As mentioned herein, the doped composite rework material further includes a dopant selected to impart an identifying characteristic that can be detected. Such identifying characteristics include characteristics that can be visually detected (e.g., detected by the naked eye, or via a mechanical optical scanner, etc.) such as, for example, by detecting a particular color or color change as compared to the color of, for example, the adjoining composite material. Further visual detection methods can include detecting a visual change, or photochromic change, when, for example, UV (ultraviolet) light, IR (infrared) radiation, or light of any useful wavelength is provided by, for example, lasers, UV lamps, IR lamps, etc.

Visually or visibly detectable identifying characteristics can be imparted to the doped composite rework material by doping the composite rework material with dopants such as, for example, dyes, pigments, or other components that produce a perceptible color change in the composite rework material. Such dopants can include a pigment dopant, a UV-absorbing dopant, a photo-sensitive dopant, an IR-absorbing dopant, and combinations thereof. Dopants that can produce a color change in the composite rework material include, for example and without limitation, West System® 501, 503 epoxy pigments (Gougeon Brothers, Inc., Bay City Mich.), System Three® epoxy pigment resins (System Three Resins, Inc., Auburn, Wash.), Fibre Glast pigments #41, #45, #47, #52 (Fibre Glast Developments Corp., Brookville, Ohio), etc.

Epoxy pigment additives can be added in liquid or solid form (e.g., powder, etc.), and can be added in an amount that will not significantly impact the curing of the epoxy-based composite material, or the performance characteristics of the epoxy-based composite material. According to one aspect, the epoxy pigment material is added to the composite rework material in an amount ranging from about 3 wt. % to about 8 wt. %. to form the doped composite rework material In another aspect, the epoxy pigment material is added to the composite rework material in an amount ranging from about 5 wt. % to about 8 wt. % to form the doped composite rework material.

According to further aspects, visual identifying characteristics in the doped composite rework materials disclosed herein can include visually perceptible identifying characteristics represented as changes in the color of doped composite rework material that can occur when a chemical compound contacts the surface of the doped composite rework material and activates the doped composite rework material. In such instances, the doped composite rework material can include a catalyst or other compound that will react with a chemical compound or element such as, for example, a solvent or other liquid as well as a solid (e.g., a powder) or gas (liquids, solids and gases collectively referred to herein as "solvents").

Such solvents can be incorporated into, for example, a cleaning agent used in a surface cleaning regimen that is part of an accepted regimen for composite material rework protocols. In such instances, the "non-activated" doped composite rework material may not exhibit any visually identifying characteristic that would distinguish the composite rework material from the surrounding composite material (including up to and even after curing). However, when a particular predetermined solvent material is provided to (e.g., wiped onto, sprayed onto, etc.) the doped composite rework material "patch" or region, a reaction occurs in the doped composite rework material sufficient to change the appearance of the doped composite rework material, and evince a visually detectable identifying characteristic (e.g., a color change, bubbling or effervescence on the doped composite rework material surface or sub-surface, etc.). In a further aspect, the solvent selected can include the catalyst compound responsible for reacting with the composite material rework material. In another aspect, the solvent can be a cleaning agent or other component used to clean a composite surface according to accepted composite cleaning protocols prior to reworking a composite material surface. In a further aspect, the solvent can be a polar or a non-polar solvent that is selected for the purpose of provoking a reaction with compounds present in the doped composite rework material.

According to a further aspect and according to methods presented herein, during preparation for rework of a composite part requiring rework, a coating material (e.g., paint) is first removed to expose a composite material section or region to be reworked. According to present aspects, if the composite material part has previously been reworked using the presently disclosed doped composite rework materials that include chemically reactive dopants, cleaning agents or other solvents brought into to contact with the rework region will react with the doped composite rework material patches and the doped composite material rework patches will, for example, change color to a perceptible degree that is able to be visually detected. Such a reaction, evidencing the presence of a formerly or previously reworked composite material region, will alert an operator to such a fact. If the solvent applied to the composite material requiring rework results in no change to the color of a composite region to be reworked, the operator will conclusively determine that the composite material region to be reworked has not been previously reworked.

According to further aspects, dopants can be included in the composite rework material to provide, for example, non-visual identifying characteristics that can be detected with the use of various detectors. For example, composite rework materials can be doped with magnetic components including, for example, nickel, nickel alloys, cobalt, cobalt alloys, iron, iron alloys, etc. to form doped composite rework materials that are magnetic, or otherwise possess a magnetic field at a level that can be detected.

The incorporation of magnetic materials as dopants into disclosed doped composite rework materials impart non-visual identifying characteristics (e.g., magnetic identifying characteristics, etc.) to the composite rework material, making the doped composite rework material detectable through the use of magnetic field detectors including, for example, magnetometers, gauss meters, other magnetic field sensors including, without limitation, MEMS (microelectronic mechanical) sensors, etc., including any device that can detect or otherwise sense and locate the presence of a magnetic field emanating from a particular component (e.g., magnetic material used as a dopant). According to present aspects, rework protocols are presented herein wherein, during a rework protocol, an area of composite material to be reworked is scanned or otherwise subjected to magnetic field testing to determine if a composite material requiring rework comprises an area or region that has been previously reworked, as evidenced by the presence of a doped composite rework material including, for example, a magnetic dopant.

The additional weight of components or dopants added to a composite rework material can be disqualifying, or at least will be taken into consideration with respect to commercially viable rework process options for reworking certain objects. For example, amounts of any additional components or dopants introduced into a composite rework material to form the presently disclosed doped composite rework materials should not significantly impact the density of the composite rework material, or otherwise adversely impact the compatibility of the rework material with the composite material being reworked. Even small weight variations taken over a significant rework area can adversely impact the performance of an object, or object components being reworked. According to present aspects, dopants that impart magnetic identifying characteristics, for example, can be added to a composite rework material formulation in an amount ranging from about 0.5 wt % to about 2.0 wt. % to form presently disclosed doped composite rework materials.

According to further aspects, further non-visual identifying characteristics can be induced by including, for example, trace amounts of dopants able to discharge low levels of non-harmful, detectable radioactivity. Such low level radioactive dopants include, for example and without limitation, naturally occurring radioactive materials such as Potassium-40, Carbon 14, etc. that can be detected by various instruments (e.g., detectors), including personal radiation detectors, dosimeters, other radiation identifiers, survey meters, etc. Present aspects contemplate rework protocols wherein, during a rework protocol, an area of composite material to be reworked is scanned or otherwise subjected to radioactive testing to determine whether a composite material requiring rework comprises an area that has been previously reworked as evidenced by the presence of a doped composite rework material comprising, for example, an amount of a non-harmful radioactive dopant. According to present aspects, dopants that impart radioactive identifying characteristics can be added to a composite rework material formulation in amounts able to be detected by instrumentation (e.g., detectors) to form doped composite rework materials, while providing non-harmful radiation, and not adversely impacting the performance of the composite material being reworked.

FIG. 4 is a flowchart outlining an illustrative method for applying the doped composite rework material according to aspects of the present disclosure. As shown in FIG. 4, a method 40 is outlined for applying 42 an amount of doped composite rework material to a substrate to form a composite rework material region. The doped composite rework material comprises a resin-based material combined with a fiber component and a dopant. The doped composite rework material is compatible with the composite material requiring rework and has an identifiable characteristic (otherwise referred to equivalently herein as an identifying characteristic). Optional steps include curing 44 the doped composite rework material, such as, for example, by applying heat at a predetermined temperature for a predetermined duration, or curing via ambient conditions.

FIG. 5 is a flowchart outlining a further illustrative method 50 relating to a reworking protocol according to present aspects including removing 52 a coating from at least a portion of a composite substrate requiring reworking and inspecting and detecting 54 a previously reworked composite material rework region that includes a doped composite rework material having an identifying characteristic. The doped composite rework material comprises a resin-based material combined with a fiber component and a dopant. The doped composite rework material is compatible with the composite material requiring rework. The method outlined in FIG. 5 further includes identifying 56 at least one identifying characteristic of the doped composite rework material.

FIG. 6 is a flowchart outlining a further method 60 according to present aspects relating to a reworking protocol including removing 52 coating from at least a portion of a composite substrate. The method 60 further includes providing 62 a solvent to the composite material rework region, and activating 64 a doped composite rework material for the purpose of detecting 54 at least one identifying characteristic of the doped composite rework material.

The following non-limiting Examples are for illustrative purposes to further describe aspects of the present disclosure, and do not serve to restrict aspects of the present disclosure.

Example 1—Visual Identifying Characteristics

To produce pre-impregnated composite rework material (e.g., composite material rework patch material, etc.) that will yield a visually identifiable characteristic (e.g., a visible characteristic or indication that is visibly detected, etc.) such as, for example, visually detectable color or color change, a quantity of color pigment or pre-mixed pigmented resin material is mixed with the resin system (e.g., in an amount ranging from about 3 wt. % to about 8 wt. %) prior to impregnation of the dry fibers, or with the fibers themselves during the production of the fibers. If applicable, the packaging of the resulting pre-impregnated material is marked as to distinguish it from material without color pigment. For wet layup repairs, a quantity of color pigment (e.g., in an amount ranging from about 3 wt. % to about 8 wt. %), or pre-mixed pigmented resin material is mixed with the resin system being used prior to executing the rework. If desired, dry fibers can be used that have been produced with the color pigment. Rework with the doped composite rework material now comprising the color pigment is then conducted.

Example 1A—Detecting the Formulation of Example 1

Per procedures applicable to the item being reworked, a region of a coated composite part is treated chemically or mechanically to remove paint and/or primer (equivalently referred to herein as "coating" or "coating material") to expose a region of uncoated composite material. Regions of varying color are visibly detected, indicating that an area of composite material requiring rework has been reworked previously.

Example 2—Visual Identifying Characteristics with Catalyst Incorporated or Applied To produce pre-impregnated repair patch material that will yield a visually identifiable characteristic (e.g., visually detectable color or color change) upon application of a polar or non-polar solvent, a quantity of color pigment or pre-mixed pigmented resin material is mixed with the resin material system (e.g., in an amount ranging from about 3 wt. % to about 8 wt. %) prior to impregnation of the dry fibers, or with the fibers themselves during the production of the fibers. Such pigment or the resin material, or other component in the resin material system includes a reactive material that is measurably visibly reactive (e.g., a reaction will occur between a reactive material and an applied solvent) and is visually detectable through a visually perceived/visually detected color change, or other visually detectable change at the composite material surface including, for example, a bubbling or effervescence, etc. If applicable, the packaging of the resulting pre-impregnated material is marked as to distinguish it from material without color pigment. For wet layup repairs, a quantity of color pigment or pre-mixed pigmented resin material (e.g., in an amount ranging from about 3 wt. % to about 8 wt. %) is mixed with the resin system being used prior to executing the rework. If desired, dry fibers can be used that have been produced with the color pigment. Rework with the doped composite rework material now comprising the color pigment is then conducted.

Example 2A—Detecting the Formulation of Example 2

Per procedures applicable to the item being reworked, a region of a coated composite part is treated chemically or mechanically to remove paint and/or primer (equivalently referred to herein as "coating" or "coating material") until the underlying composite material is exposed and the composite material in the composite material region to be reworked is visible. Using an application device such as a sponge, cloth, or other applicator, etc., a solvent (or solvents) is applied to the composite material rework area to activate the reactive material that is embedded in the composite rework material. A predetermined reaction occurs as the solvent reacts with the reactive material to achieve a change in the composite rework material that is visibly detected, and that visibly indicates the presence of rework material, indicating that the area (presently requiring rework) was previously reworked. According to present aspects, the applied solvent(s), or the pigment(s) or other additive(s) incorporated into the composite material rework patch can comprise the material considered to be the catalyst, for example, in the presence of a predetermined solvent. Any combination of materials that will react to achieve a color change or other visually detectable change at the surface of or within the composite material is contemplated by aspects of the present disclosure.

Example 3—Magnetic Identifiable Characteristics

To produce pre-impregnated composite rework patch material having detectable magnetic characteristics (e.g., detectable magnetic values, etc.) a quantity of nickel, nickel alloy, cobalt, cobalt alloy, iron, iron alloy, or other magnetic material, etc., is mixed with the composite rework material resin system (e.g., in an amount detectable by a magnetometer or other instrument, including, for example an amount ranging from about 0.5 wt. % to about 2.0 wt. %, etc.) prior to resin impregnation of the dry fibers, or with the fibers themselves during the production of the fibers. If applicable, mark the packaging of the resulting pre-impregnated material as to distinguish it from material without embedded magnetic material. For wet layup rework, a quantity of nickel, nickel ally, cobalt, cobalt alloy, iron, iron alloy, or other magnetic material, etc., is mixed with the resin system being used prior to executing the rework, or dry fibers that have been produced with the magnetic material are used. The composite material is then reworked with composite rework material containing (e.g., doped with) the magnetic material (e.g., the magnetic dopant).

Example 3A—Detecting the Formulation of Example 3

Using a commercially available or purpose-built magnetometer, the area of composite material requiring rework is surveyed (e.g., inspected). The presence of a given level of magnetic field, as measured in specific units of tesla, gauss, etc., indicates the presence of doped composite rework material. Alternatively, per procedures applicable to the item being reworked, paint and/or primer (equivalently referred to herein as "coating" or "coating material") is chemically or mechanically removed until the underlying composite material is exposed and the material in the region to be reworked is visible. A commercially available or purpose-built magnetometer, is then directed over the area of the composite material being reworked to survey the area of composite material for detectable magnetic activity. The presence of a given level of magnetic field, as measured in specific units of tesla, gauss, or other, indicates the presence of magnetically doped composite rework material, and indicates that the area has been previously reworked.

Example 4—Composite Rework Material—Other Identifiable Characteristics

To produce pre-impregnated repair patch material, a quantity of Potassium-40, Carbon 14, etc. or other radioactive material is mixed with the resin system prior to impregnation of the dry fibers, or with the fibers themselves during the production of the fibers. If applicable, mark the packaging of the resulting pre-impregnated material as to distinguish it from material without embedded radioactive material. For wet layup repairs, a quantity of Potassium-40, Carbon 14, etc. or other radioactive material is mixed with the resin system being used prior to executing the repair, or dry fibers that have been produced with the radioactive material is used. The composite material is then reworked with composite rework material containing (e.g., doped with) the non-harmful radioactive material (e.g., the radioactive dopant).

Example 4A—Detecting the Formulation of Example 4

Using a commercially available or purpose-built gaseous ionization detector, Geiger counter, scintillation counter, or other radiation detector, the area of composite material requiring rework is surveyed (e.g., inspected). The detection of a given level of radiation indicates the presence of previously applied, radiation-doped composite rework material (e.g., radiation-doped composite rework material applied to the region during a prior rework operation). Alternatively, per procedures applicable to the item being reworked, the paint and/or primer (equivalently referred to herein as "coating" or "coating material") covering the composite component is chemically or mechanically removed until the composite material is exposed and the composite material in the region to be reworked is visible. Then, the area of composite material requiring rework is surveyed (e.g., inspected) using a commercially available or purpose-built gaseous ionization detector, Geiger counter, scintillation counter, or other radiation detector, survey. The presence of a given level of radiation indicates the presence of radiation-doped composite rework material.

Aspects of the present disclosure describing the detection of non-visual identifying characteristics can further facilitate scheduled inspections of objects comprising composite materials by detecting doped-composite rework material, and thereby detect the state of previously reworked composite material sections or regions, or to confirm the location of previously reworked composite material sections or regions.

According to aspects, the rework methods and systems described herein, as well as the composite rework materials disclosed, find utility in the rework of objects comprising composite material components and parts. Such objects include, for example and without limitation, objects used in structural engineering including bridges, spans, buildings, conduits and pipes, sporting goods, etc.

According to further aspects, such objects further include, for example and without limitation, manned and unmanned spacecraft, manned and unmanned aircraft, manned and unmanned hovercraft, manned and unmanned rotorcraft, manned and unmanned terrestrial vehicles, manned and unmanned surface watercraft, manned and unmanned sub-surface watercraft, manned and unmanned satellites, etc., and combinations thereof.

Aspects of the present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A substrate comprising:
   a visually detectable composite rework material region in a reworked structure, said visually detectable composite rework material region comprising a visually detectable composite rework material, said visually detectable composite rework material comprising:
      a visually detectable resin-based composite material, said visually detectable resin-based composite material comprising:
         a fiber-containing material;
         a resin-containing material;
         a dopant, said dopant comprising a pigment, said dopant configured to impart a visually detectable characteristic to the visually detectable composite rework material region;
   wherein the visually detectable composite rework material region comprises the visually detectable characteristic;
   wherein the visually detectable characteristic is configured to be perceived throughout the entirety of the visually detectable composite rework material region both at the time the visually detectable composite rework material is configured to form the visually detectable composite material rework region and throughout the life of the reworked structure; and
   wherein the dopant is present in an amount that will not significantly impact the performance characteristics of the visually detectable resin-based composite material.

2. The substrate of claim 1, wherein the visually detectable composite rework material region further comprises a non-visual identifying characteristic.

3. The substrate of claim 1, wherein the visually detectable composite rework material region further comprises at least one of: a UV-absorbing dopant; a photo-sensitive dopant; an IR-absorbing dopant; and combinations thereof.

4. The substrate of claim 3, wherein the dopant is present in an amount ranging from about 3 wt. % to about 8 wt. % of the detectable resin-based composite material.

5. The substrate of claim 1, wherein the visually detectable composite rework material region further comprises a magnetic dopant.

6. The substrate of claim 1, wherein the fiber-containing material comprises at least one of:
   a glass fiber, a carbon fiber, a boron fiber, an aramid fiber, or combinations thereof.

7. The substrate of claim 1, wherein the resin-containing material comprises: an epoxy-based resin or an acrylamide-based resin.

8. An object comprising the substrate of claim 1.

9. The object of claim 8, wherein the object is a vehicle.

10. The vehicle of claim 9, wherein the vehicle is selected from the group consisting of:
    a manned aircraft, an unmanned aircraft, a manned spacecraft, an unmanned spacecraft, a manned rotorcraft, an unmanned rotorcraft, a drone, a satellite, a manned terrestrial vehicle, an unmanned terrestrial vehicle; a manned surface marine vehicle, an unmanned surface marine vehicle, a manned sub-surface marine vehicle, an unmanned sub-surface marine vehicle, and combinations thereof.

11. A method for precluding reworking a previously reworked composite substrate, the method comprising:
    applying a visually detectable composite rework material patch to a composite substrate to form a visually detectable composite rework material region in a reworked structure, the detectable composite rework material patch comprising:
       a visually detectable resin-based composite material, said detectable resin-based composite material comprising:
          a fiber-containing material;
          a resin-containing material;

a dopant, said dopant comprising a pigment, said dopant configured to impart a visually detectable characteristic to the visually detectable composite rework material patch;

imparting the visually detectable characteristic to the composite rework material region at a visually detectable reworked composite substrate surface;

wherein the visually detectable characteristic is configured to be perceived throughout the entirety of the visually detectable composite rework material region both at the time the visually detectable composite rework material is configured to form the visually detectable composite material rework region and throughout the life of the reworked structure; and wherein the dopant is present in an amount that will not significantly impact the performance characteristics of the visually detectable resin-based composite material.

12. The method of claim 11, further comprising:
curing the visually detectable composite rework material patch.

13. The method of claim 11, wherein the visually detectable composite rework material region further comprises a non-visual identifying characteristic.

14. The method of claim 11, wherein the visually detectable composite rework material region further comprises at least one of: a UV-absorbing dopant; a photo-sensitive dopant; an IR-absorbing dopant; and combinations thereof, said dopant present in the detectable composite rework material patch in an amount ranging from about 3 wt. % to about 8 wt. % of the detectable composite rework material patch.

15. The method of claim 11, wherein the detectable composite rework material region further comprises a magnetic dopant.

16. The method of claim 11, wherein the detectable composite rework material region further comprises a radioactive dopant.

17. The method of claim 11, wherein the fiber-containing material comprises at least one of: a glass fiber, a carbon fiber, a boron fiber, and an aramid fiber.

18. The method of claim 11, wherein the resin-containing material comprises: an epoxy-based resin or an acrylamide-based resin.

19. A method for detecting a composite rework material region on a substrate, the method comprising:
removing a coating from a coated composite material substrate to expose a visually detectable composite rework material region in a reworked structure;
detecting the visually detectable composite rework material region, said visually detectable composite rework material region comprising a detectable composite rework material, said detectable composite rework material comprising:
a fiber-containing material;
a resin-containing material;
a dopant, comprising a pigment, said dopant, said dopant configured to impart a visually detectable characteristic to the visually detectable composite rework material at a detectable composite rework material substrate surface; and
visually detecting at least one visually detectable characteristic of the visually detectable composite rework material region at least at the composite rework material substrate surface region both at the time the visually detectable composite rework material is configured to form the visually detectable composite material rework region and throughout the life of the reworked structure.

20. The method of claim 19, wherein before the step of detecting the detectable composite rework material region, further comprising:
providing a catalyst to the visually detectable composite rework material region at a substrate surface; and
activating the visually detectable characteristic at the substrate surface.

* * * * *